Sept. 12, 1961 P. J. MALINARIC 2,999,905

NOISE ELIMINATOR

Filed Jan. 9, 1958

INVENTOR.
PAUL J. MALINARIC
BY
ATTORNEY

United States Patent Office 2,999,905
Patented Sept. 12, 1961

2,999,905

NOISE ELIMINATOR

Paul J. Malinaric, Allegheny County, Pa.
(2539 Homehurst Ave., Pittsburgh 34, Pa.)

Filed Jan. 9, 1958, Ser. No. 707,977
10 Claims. (Cl. 179—100.1)

My invention relates to noise elimination electronic apparatus and more particularly to a device for eliminating the noise component from one of a plurality of similar signals.

In accordance with the prior art of which I am aware phonograph records are customarily made from master records which are the original recording of a composition of music or similar event. From the master record there is a second record, sometimes called a mother record, which is usually made of brass or similar metal carrying the same information as that on the master. Several mother records may be made from a single master record. However, when the master record and the mother records have been worn out or lost and it is desired to reproduce a clear recording from a plurality of records made from the original master, it is desirable to eliminate the noise component from the records. Usually this noise component which is undesirable is present at any given instant in individual records but is not a component of all of the records produced from a given master. It is accordingly desirable to obtain some manner of producing a new master record from a plurality of old records which new master record will be free from an undesirable spurious noise component.

It is accordingly an object of my invention to provide an improved device for making a new master record from a plurality of old similar phonograph records.

It is accordingly another object of my invention to provide an improved electronic deviation eliminator.

It is still another object of my invention to provide an improved electronic device.

It is an ancillary object of my invention to provide a new and useful article of manufacture.

In accordance with my invention I provide three or more records having connected thereto means for picking up the signals from the records and transmitting an electric signal in response to the information on the phonograph records. These transcription devices are coordinated and the records are records originally made from a common master so that they are similar in every respect except for random noise pattern which is peculiar to each record. The output from each record transcription apparatus is fed into a noise deviation eliminator. The deviation eliminator comprises preferably three or more nonlinear resistances connected together at one end of the said resistances at a common junction and having the other end of each of the three non-linear resistances connected to the output from one of the transcription devices.

By the term non-linear resistance I mean a device having a characteristic curve such that the curve of voltage versus current is not a straight line over its entire length. Preferably the characteristic curve should have a sharp cut-off point. By a cut-off point on the characteristic curve I mean that above a certain value of voltage the current does not further increase. The characteristic curve preferably has a cut-off point of this nature both on the positive side and the negative side of the curve and is symmetrical about the voltage axis.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which:

In accordance with my invention I provide a plurality, preferably three or more, phonograph record transcription devices, 4, 5 and 6 of a type well known in the art for producing an electronic signal in response to the information recorded on phonograph records. The transcription apparatuses 4, 5, 6 preferably comprise electronic pick up apparatus having an output connected to a variable gain pre-amplifier the signals of which are synchronized so that all three devices are producing a signal from the same portion of their respective records at the same time and the gain of each of the pre-amps is adjusted so that the magnitude of all of their outputs are equal to each other. The value of their gains will be determined by other considerations to be discussed later. The three records are recordings of the same event preferably made from a common master. The outputs from the pre-amplifiers of the transcription devices are connected to non-linear resistances, 7, 8, 9 one of the outputs from the pre-amplifiers of each of the transcription devices being connected to each of the said three non-linear resistances. The opposite ends of each of the three non-linear resistances from that which is connected to the output of the pre-amplifiers of each transcription apparatus are connected together at a common terminal forming the output of the apparatus. This output as will be shown hereinafter is substantially free from noise components which are present on the individual records.

Figure 2:
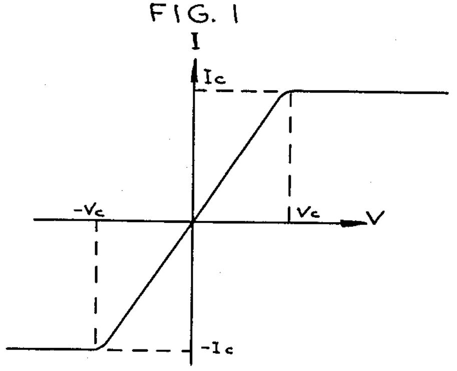
FIGURE 2 is a characteristic curve of a theoretical ideal non-linear resistance of the type employed in a preferred embodiment of my invention.

The non-linear resistances preferably have a characteristic curve of voltage versus current substantially as shown in FIGURE 2 whereby from a predetermined negative voltage which I shall call *Vc* to a predetermined positive voltage which I shall call *Vc* the characteristic curve is preferably substantially a straight line i.e. the relationship between the current and the voltage is continuous. Above the predetermined voltage *Vc* the current fails to increase and below the predetermined voltage *Vc* the current fails to decrease. We thus have what is known as in the art as positive and negative cutoff points. Preferably these cutoffs are as complete as possible.

Figure 3:
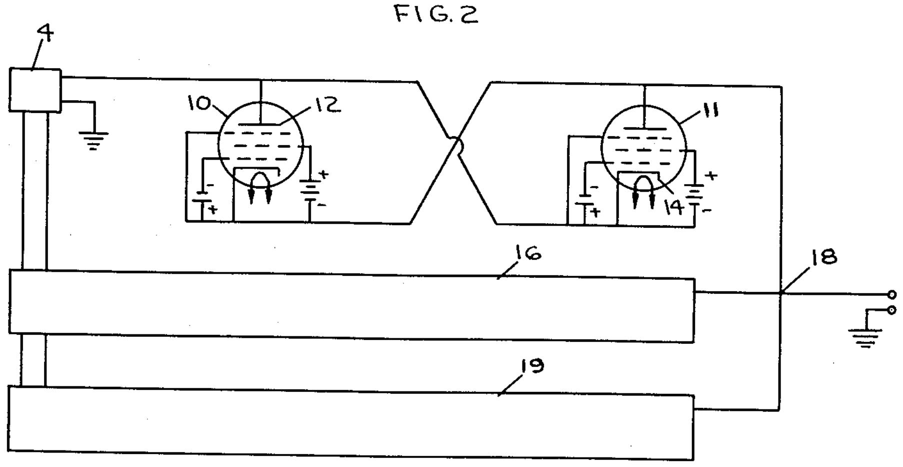
FIGURE 3 is a schematic showing partially in block form and partially in detail of apparatus in accordance with a preferred embodiment of my invention.

In accordance with one embodiment of my invention I provide pentodes which operate as non-linear resistances having characteristic curve substantially as described above. The output from the first transcription apparatus 4 is connected to the anode 12 of the first pentode 10 and to the cathode 14 of a second pentode 11. The cathode of the first pentode 10 is connected to the anode of the second pentode 11 and to the common junction between the non-linear resistances which constitute the output of the circuit. The cathode, as is well known in the art, is preferably of a heated type and is connected through a first battery or a similar source of potential, to a first grid, the said source of potential being oriented so as to place a negative bias on the first grid which is located nearest the cathode. A second grid is provided between the said first grid and the anode, said second grid being biased positively with respect to said cathode. A third grid is provided which is connected directly to the cathode and maintained at the cathode potential and is located between the said second grid and the anode. The two pentodes connected in this manner together form a non-linear resistance having a characteristic curve similar to that shown in FIGURE 2. The values of $Ic$ and $Vc$ are determined by the magnitudes of the above mentioned grid bias voltages. A second 16 and third 19 devices comprising non-linear resistances comprising pentodes and being connected to transcribing apparatus are shown in block form in FIGURE 3 and are similar to the first transcribing device and non-linear resistance connected thereto.

As will be apparent to one skilled in the art when a positive signal is applied to the anode 12 of the first pentode 10 above a certain predetermined quantity there will be a pile-up of electrons in the region of the third grid. These electrons will produce a negative potential in that region discouraging additional electrons from approaching that grid and causing them to return to the cathode. Thus as the potential increases beyond the predetermined quantity the current through the tube does not increase.

When a positive potential is applied to the anode of the first pentode 10 and to the cathode of the second pentode a current flows only through the first pentode. A positive pulse is therefore transmitted to the output junction i.e. electrons are drawn from the output junction, but the current therefrom is limited to the maximum current through the tubes, $Ic$.

In reverse manner when a negative pulse is transmitted from the transcribing apparatus and applied to the anode of the first pentode 12 and the cathode of the second pentode 11 the second pentode 11 conducts and a stream of electrons pass across the second pentode 11 to the output 18 producing a negative pulse at the output junction, said current pulse being limited in magnitude to $Ic$.

In accordance with other embodiments of my invention other types of non-linear resistors such as transistors or beam power tubes may be employed in a manner similar to that shown for the pentodes.

Figure 1:
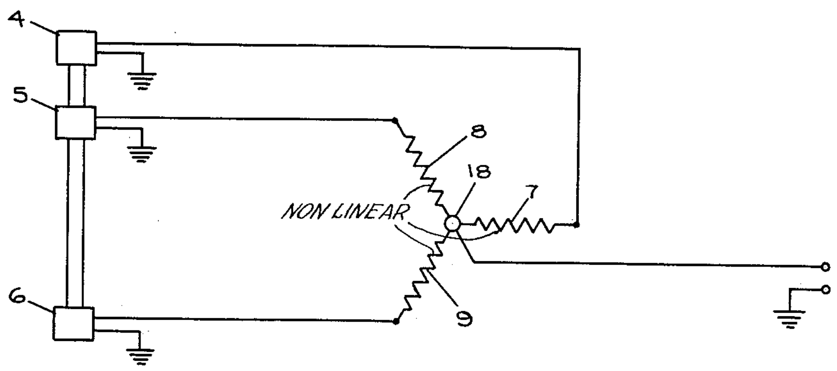
FIGURE 1 is a schematic showing of non-linear resistances organized in a manner in accordance with one embodiment of my invention.

The following theoretical discussion will point up the advantages and ingenuity of my invention, particular attention being paid to FIGURE 1 showing schematically the organization of three non-linear resistances connected to three transcription apparatuses.

In actual operation all of the input voltages of the deviation eliminator are of the same amplitude and are the same functions of time when there is no random noise present on any of the record inputs. In this case, if the load on the output is negligible, there will be essentially no current flowing through any of the resistors. Therefore $V_o=V_1=V_2=V_3$, where $V_o$ is the output voltage and $V_1$, $V_2$, $V_3$ are the above ground potentials applied to the first, second and third non-linear resistances respectively. Now suppose that at a particular instant of time input #1 has a noise potential as a component thereof and inputs #2 and #3 don't. Input #1 will differ from the other two inputs in voltage and consequently current will flow through the resistors. In this case we have the following equations:

(1) $V_1=V_s+V_n$ (2) $V_2=V_3=V_s$ (3) $V_o=V_s+V_{n'}$ where $V_1$, $V_2$, $V_3$ are the voltages of the respective input terminals, $V_o$=voltage on output, $V_s$=the voltage on all of the inputs due to the sound component of the record patterns, and $V_n$=the voltage by which the input #1 differs from the other two due to noise on its record. Ideally we desire $V_{n'}$, the corresponding noise voltage of the output due to $V_n$ to be equal to zero. The following equations and derivations are for the purpose of solving for $V_{m'}$ as a function of $V_m$: If we assume that the voltage across resistor #1 is greater than $Vc$ the cutoff voltage, then the current through it will be $I_c$ and by Kirchoff's current law and by symmetry the currents through each of the other two resistors will be $\frac{1}{2}Ic$. Now if the curve is roughly linear in the region between $-V_c$ to $V_c$ the voltage across the other input resistors will be approximately equal to $\frac{1}{2}Vc$. In general if the curve isn't linear in this region, these voltages will be within 0 to $-Vc$. $V_o$ differs from the other two "quiet" inputs by about the amount $-\frac{1}{2}Vc$, or in the non-linear case by $-V_c$ at most, therefore the output noise ratio, $R_{n'}=V_{n'}/V_s$ will never exceed the value $V_c/V_s$. For $V_n$ greater than $V_c$ we will have the noise ratio reduced by a factor of $$\frac{R_n'}{R_n}=\frac{V_c/V_s}{V_n/V_s}=V_c/V_n$$

It is thus shown that one can reduce the noise ratio indefinitely by making $V_n$ larger and larger. This means one must make the input amplifiers have a large gain so as to make $V_n$ large compared to $V_c$. There is no theoretical limit to how high we can make the gain of the pre-amplifiers between the pickups and the inputs of deviation eliminator but if we make it too high the fact that the gains aren't exactly alike or that the sound components of the record aren't exactly the same to an infinite degree, will cause differences in potential between the inputs of the order of $V_c$ even when there is no random noise on any of the inputs. In this case the circuit will be ineffective. Also if two out of three records should have a random noise simultaneously the device will be ineffective. This and other practical considerations will put a limit on the amount by which the noise ratio can be reduced.

One can adjust the grid biases, which determine $V_c$ and $I_c$ and the value of the magnitude of input signals to the deviation eliminator so as to have the highest possible gain that will keep the error voltages due to uncontrollable system imperfections within the range from $-V_c$ to $/-V_c$.

The usefulness of this invention depends on the fact that it is much less probable for two noises to occur simultaneously than for each to occur separately. However, if two simultaneous noises appear on the inputs, a noise will also appear on the output. If $P_1$, $P_2$ $P_3$ are the probabilities that noise potentials greater than $V_c$ will appear on the respective inputs, it can be shown that the probability of a noise potential greater than $V_c$ appearing on the output is $P_o=P_1P_2\ P_1P_3\ P_2P_3\ -2P_1P_2P_3$. In the particular case when $P_1=P_2=P_3=P$ we get $P_0=3P^2-2P^3$. Thus if $P=0.1$ we get $P_0=0.028$; if $P=0.01$ we get $P_0=0.0003$. In the first case we have reduced the noise probability by $^{28}/_{100}$ and in the second case we have reduced it by a factor of $^{3}/_{100}$. In all cases the noise probability is reduced below its value on the original recordings. For a higher number of inputs and smaller values of P we would get even better results.

I have thus provided a device for transcribing the information from a plurality of old records onto a new record without transcribing the noise component on the old records along with the sound. The three or more non-linear resistances act as a deviation eliminator so that deviations of one of the records from the pattern set by the other two records has a limited effect on the output.

I have thus provided, in addition, an apparatus whereby a plurality of three or more signals may be received, all three of these signals having desirable information on them and having the same desirable information, and one of these signals having at a particular instant a noise component which is peculiar to that one signal and is not present to a substantial degree in the other signals. When the signals are led into separate non-linear resistances of a deviation eliminator as described herein, the noise component will be substantially removed and the resultant output will be a static free signal bearing the desired information.

Although I have shown and described specific embodiments of my invention, I am aware that other modifications thereof are possible; my invention, therefore, is not to be restricted except insofar as is necessitated by the prior art and the spirit of the invention.

I claim as my invention:

1. A first record transcription means producing electric signals from a first record, a second record transcription means producing electric signals from a second record and a third record transcription means producing signals from a third record, current limiting non-linear resistances connected to said means, one end of each of said resistances being connected to the output of one of said means, the minimum desirable transcription signal potential being not less than the cut off voltage of the said resistances, and the other ends of each of said resistances being connected together at a common junction.

2. In combination at least three record transcription means producing responses from a plurality of different records, each of said record transcription means being responsive to one of said records, said record transcription means having synchronizing means connected therebetween, at least three current limiting non-linear resistances, one end of each of said resistances being connected to the output of one of said means, the minimum desirable reproduction potential being not less than the cut off voltage of the said resistances, and the other ends of each of said resistances being connected together at a common junction.

3. At least three record transcription means producing electric signals, separate current limiting non-linear resistances connected at one end to the output of each of said means, the minimum desirable transcription potential being not less than the cut off voltage of the said resistances and the other ends of each of said resistances being connected together at a common junction.

4. A first electrical transcription means responsive to a phonograph record to produce an electric signal, a second record transcription means and a third transcription means similar to said first record transcription means and connected to separate records made from the same original recording, a common junction, three current limiting non-linear resistances, one end of each of said resistances being connected to the output of one of said means, the cut off voltage of the said resistances being less than the minimum desirable signal potential, and the ends of each of said resistances being connected together at a common junction.

5. In combination at least three record transcription means producing responses from a plurality of different records, each of said record transcription means having synchronizing means connected therebetween, at least three current limiting non-linear resistances, one end of each of said resistances being connected to the output of one of said devices, the minimum desirable transcription potential being not less than the cut off voltage of the said resistances, and the other ends of each of said resistances being connected together at a common junction.

6. Three or more record transcription means producing an electric signal, at least three current limiting non-linear resistances, one end of each of said resistances being connected to the output of one of said means, the minimum desirable transcription signal potential being not less than the cut off voltage of the said resistances, and the other ends of each of said resistances being connected together at a common junction.

7. A first electrical transcription means, a second electrical transcription means and a third transcription means similar to said first transcription means and connected to separate sources of information having the same intelligence and different noise components, said means being synchronized so that the said intelligence components on their outputs is synchronized in time and equal in magnitude, at least three current limiting non-linear resistances, one end of each of said resistances being connected to the output of one of said means, the minimum desirable first signal potential being not less than the cut off voltage of the said resistances, and the other end of each of said resistances being connected together at a common output junction.

8. In combination, at least three energy production means, each of said energy production means producing a signal having first and second components, the first components of which are the same for all of the said means, said means being capable of producing a signal having the said second component of a random nature, said means being synchronized so that the said first component on their outputs is synchronized in time and equal in magnitude, at least three current limiting non-linear resistances, one end of each of said resistances being connected to the output of one of said means, the minimum desirable first signal potential being not less than the cut off voltage of the said resistances, and the other end of each of said resistances being connected together at a common junction.

9. A first electronic means producing electric signals comprising a sound and a noise component, a second electronic means producing electric signals comprising a sound component equal to that produced by said first means and a different noise component, and a third electronic means producing a sound component equal to said first means and a different noise component from said first and said second means, at least three current limiting non-linear resistances, one end of each of said resistances being connected to the output of one of said means, the minimum desirable sound component potential being not less than the cut off voltage of the said resistances, and the other ends of each of said resistances being connected together at a common output junction.

10. In combination a plurality of energy production means, said energy production means producing a signal having an intelligence component which is the same for all of the said means, said means being capable of producing a signal having different noise patterns on each means, said means being synchronized so that the intelligence on their output is synchronized in time and equal in magnitude, a plurality of current limiting non-linear resistances, one end of each of said resistances being connected to the output of one of said means, the minimum desirable potential of the intelligence component of said means being not less than the cut off voltage of the said resistances, and the other ends of each of said resistances being connected together at a common junction.

References Cited in the file of this patent

UNITED STATES PATENTS

| | | |
|---|---|---|
| 2,791,629 | Byrd | May 7, 1957 |
| 2,807,679 | Ellis | Sept. 24, 1957 |
| 2,845,490 | Knight | July 29, 1958 |

FOREIGN PATENTS

| | | |
|---|---|---|
| 478,605 | Great Britain | Jan. 21, 1938 |
| 537,437 | Great Britain | June 23, 1941 |